United States Patent [19]

Doody

[11] 4,108,207
[45] Aug. 22, 1978

[54] MULTIPLE-PORT VALVE

[75] Inventor: Thomas J. Doody, Downers Grove, Ill.

[73] Assignee: The United States of America as represented by the United States Department of Energy, Washington, D.C.

[21] Appl. No.: 787,137

[22] Filed: Apr. 13, 1977

[51] Int. Cl.² ............... F16K 5/06; F16K 11/087
[52] U.S. Cl. ............... 137/625.47; 251/368; 137/614.17
[58] Field of Search ............... 137/625.47, 625.41; 251/368

[56] References Cited
U.S. PATENT DOCUMENTS

| 3,130,750 | 4/1964 | Post | 137/625.41 |
| 3,167,086 | 1/1965 | Michalski | 137/315 |
| 3,305,211 | 2/1967 | Phillips | 137/625.47 X |

Primary Examiner—Arnold Rosenthal
Attorney, Agent, or Firm—Dean E. Carlson; Hugh W. Glenn

[57] ABSTRACT

A multiple-port valve assembly is designed to direct flow from a primary conduit into any one of a plurality of secondary conduits as well as to direct a reverse flow. The valve includes two mating hemispherical sockets that rotatably receive a spherical valve plug. The valve plug is attached to the primary conduit and includes diverging passageways from that conduit to a plurality of ports. Each of the ports is alignable wih one or more of a plurality of secondary conduits fitted into one of the hemispherical sockets. The other hemispherical socket includes a slot for the primary conduit such that the conduit's motion along that slot with rotation of the spherical plug about various axes will position the valve-plug ports in respect to the secondary conduits.

10 Claims, 5 Drawing Figures

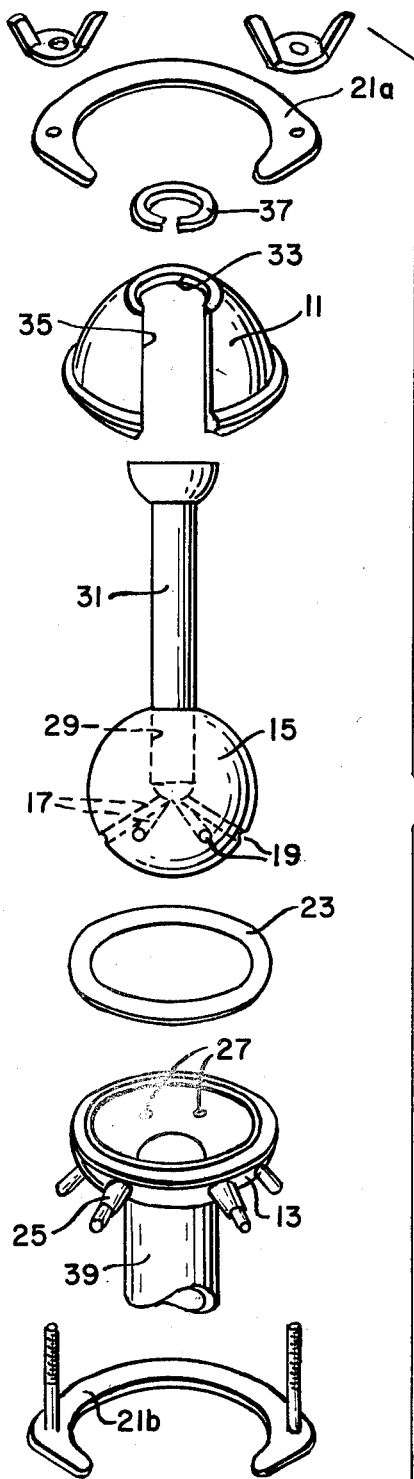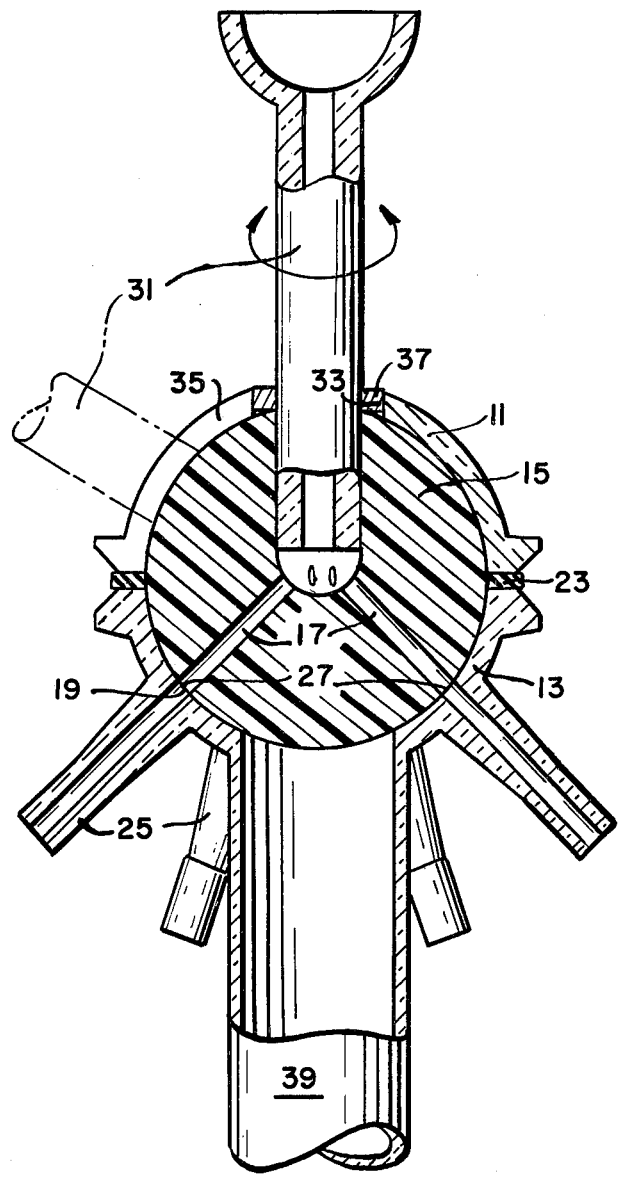

4,108,207

MULTIPLE-PORT VALVE

CONTRACTUAL ORIGION OF THE INVENTION

The invention described herein was made in the course of, or under, a contract with the UNITED STATES ENERGY RESEARCH AND DEVELOPMENT ADMINISTRATION.

BACKGROUND OF THE INVENTION

The present invention relates to valves having a number of ports that can be used to feed a single gas, liquid or slurry supply to one or more different applications. For example, liquid media from a common supply can be provided for a number of bacteria-growth cells and air bubbles within the feed can be diverted when detected. In addition the valve can be employed as a fraction cutter in liquid and gas chromatographic separations, for instance, following an ion exchange resin from which particular ions are selectively eluded. Vapor fractions based on boiling point might also be separated with a valve of the type described in conjunction with a mass spectrometer type of analysis or separation.

Previous multiple-port valves have been of the ordinary three or four-way valve types. Complex fluid flow transfer problems are often handled by providing a complex array containing a number of such valves. Piping and control circuitry become extremely complex and cumbersome with the use of such multiple-component systems, the failure of any of which may require tedious trouble shooting procedures in order to locate, replace or repair the defective part.

Therefore, in order to avoid these problems of previous valving arrangements, it is an object of the present invention to provide a multiple-port valve that can be employed to effect fluid flow transfer from one inlet to one or more of a plurality of outlets.

It is also an object to provide such a valve that can introduce fluid flow from one or more of a plurality of inlets and into a single outlet.

It is a further object to provide such a multiple-port valve that can briefly divert undesired fluid flow into a dump outlet and subsequently return to the ordinary flow pattern.

SUMMARY OF THE INVENTION

In accordance with the present invention a multiple-port valve assembly is provided for interconnecting a primary conduit with one or more of a plurality of secondary conduits. The assembly includes a first hemispherical socket having a slotted opening that movably receives the primary conduit. A second hemispherical socket is sealingly and rotatably connected to the first socket such that together they define a generally spherical volume. The second socket includes a plurality of openings each communicating with one of the plurality of secondary conduits. A spherical plug is rotatably received within the spherical volume between the two sockets. The plug has a first passageway for receiving one open end of the primary conduit and has a plurality of secondary passageways that extend from the first passageway to a plurality of ports within its surface. On rotation of the spherical plug the plurality of ports are alignable, one or more with the plurality of openings within the second hemispherical socket. This is accomplished by rotating the spherical plug about the axis of the primary conduit, by rotating the spherical plug such that the primary conduit moves within the slotted opening of the first hemispherical socket and by rotating the spherical plug along with the first hemispherical socket in relation to the second hemispherical socket.

In more specific aspects of the invention, indexing means are provided between the primary conduit and the slot of the first hemispherical socket as well as between the two hemispherical sockets. The indexing permits precise positioning of the valve components to desired location. In addition other components such as sleeves or liners with opening patterns designed for particular valving functions and sealing or lubricative components are contemplated.

BRIEF DESCRIPTION OF THE DRAWINGS

The present invention is illustrated in the accompanying drawings wherein

FIG. 1 is an exploded perspective view of a multiple-port valve assembly.

FIG. 2 is a cross sectional view of a multiple-port valve assembly illustrating one alternate position.

FIG. 3b is a side view in section of a second hemispherical socket in engagement with the socket and indexing means of FIG. 3a.

DETAILED DESCRIPTION OF THE PREFERRED EMBODIMENT

Figure 3A:
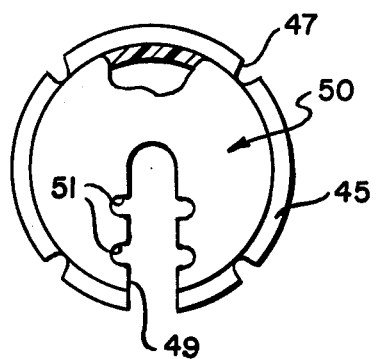
FIG. 3a is a plan view of a hemispherical socket including indexing means for use in a valve assembly similar to that of FIG. 1.

Referring to FIGS. 1 and 2, a multiple-port valve is illustrated in an exploded view and in an enlarged cross sectional side view. As shown, the valve body includes an upper hemispherical socket 11 that is sealingly but rotatably connected to a corresponding lower socket 13 such that the two define a spherical volume. The spherical volume is occupied by a spherical valve plug 15 which is provided with a plurality of passageways 17 terminating in ports 19.

A suitable clamping device 21a and 21b (shown only in FIG. 1) holds the two hemispherical sockets 11 and 13 together against a sealing and lubricative ring 23 to permit relative rotation of the two sockets in a sealed condition. Ring 23 along with spherical plug 15 are preferably of a material such as Teflon (polytetrafluoroethylene) with sockets 11 and 13 of glass or a steel alloy to permit lubricative sealing engagemen. As an alternative, spherical plug 15 can be provided of another material such as a steel alloy if suitable sealing rings of a lubricative, resilient and durable material are placed around each of the port openings 19 and at a circumference of the spherical plug above ports 19 and in contact with the lower hemispherical socket 13.

A plurality of conduits 25 (hereinafter designated secondary conduits) are shown penetrating a wall of the lower hemispherical socket 13 and terminating with openings 27 on the internal surface of socket 13. Openings 27 are alignable as shown with one or more of ports 19 within the spherical valve plug 15. Such alignment is achieved through rotation of the valve plug 15. Openings 27 and ports 19 can be placed in alignable, corresponding circumferences of the hemispherical socket 13 and the valve plug 15 respectively.

Valve plug 15 is provided with a primary passageway 29 that is adapted to receive a primary conduit 31 within its upper portion corresponding to the upper hemispherical socket 11. Passageway 29 extends into communication with passageways 17 so as to interconnect primary conduit 31 with one or more of the secondary conduits 25 whenever spherical valve plug 15 is appropriately aligned.

Primary conduit 31 is received through upper hemispherical socket 11 by way of a top opening 33 at the socket apex. Opening 33 continues into a slot 35 which extends from the socket 11 apex to its lower circumference near the lower hemispherical socket 13. Slot 35 and opening 33 are of sufficient width to receive primary conduit 31 and a sealing ring 37 of lubricative material. Movement of conduit 31 in slot 35 is accompanied by corresponding rotation and positioning of spherical valve plug 15. Such positioning is illustrated in the alternate placement of primary conduit at 31, illustrated in FIG. 2.

Other modes for positioning the multiple-port valve include the rotation of spherical plug 15 about an axis passing through primary conduit 31 and the rotation of upper hemispherical socket 11 along with spherical plug 15 about plug axes passing through the apex of socket 11. This latter mode is ordinarily used when conduit 31 is positioned along slot 35. The combination of these operational modes gives great flexibility in the alignment of ports 19 of the valve plug 15 with one or more of the corresponding openings 27 into secondary conduits 25.

Lower hemispherical socket 13 is illustrated with a somewhat larger conduit 39 at its apex than each of the secondary conduits 25. Conduit 39 is not ordinarily aligned with one of the ports 19 illustrated within valve plug 15. When plug 15 is rotated such that primary conduit 31 moves downwardly in slot 35, any of the ports 19 and connecting passageways 17 can be readily disposed in alignment with conduit 39. With primary conduit 31 positioned in slot 35, rotation of spherical plug 15 about its axis passing along primary conduit 31 or about an axis passing through the apex of upper socket 11 can bring other of the ports 19 into alignment with conduit 39. Conduit 39 can thereby be employed as a diversion or dump channel for material which is unsuitable for the process being controlled. For example, bubbles of air or other gases within media feed lines to bacteria growth cells could be easily removed prior to flow into the cells.

Figure 3B:
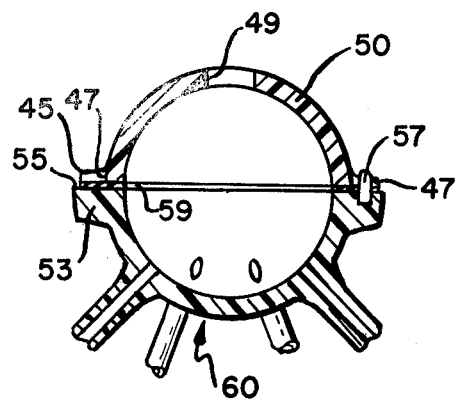

Turning now to FIGS. 3a and 3b, a somewhat altered upper hemispherical socket 50 and lower hemispherical socket 60 are illustrated. In FIG. 3a, a plan view of the upper hemispherical socket 50 shows a flange 45 positioned about the lower periphery at the socket base. The flange 45 includes a plurality of U-shaped grooves 47 spaced around its circumference. As described above, a slot 49 is included from the apex of the socket to its base Indexing grooves 51 of U shape are likewise provided along the edge surfaces of slot 49.

In FIG. 3b, a second hemispherical socket 60 is illustrated engaging socket 50 through sealing ring 59. This second socket includes a flange 53 of somewhat greater width than flange 45 of socket 50. The upper surface 55 of flange 53 is provided with one or more spring-loaded balls or pins 57 which can be extended as shown or recessed within suitable openings to below the surface of sealing ring 59 on the application of pressure. Pins 59 are arranged on a circumference corresponding to the circumference containing the U-shaped grooves 47 in flange 45 of hemispherical socket 50 shown in FIG. 3a.

On assembling the sockets 50 and 60 together as parts of a multiple-port valve, pins 57 are depressed into aligned openings to below the surface of sealing ring 59 through engagement with the lower surface of flange 45. On rotation of hemispherical socket 50 in respect to socket 60, pins 57 and grooves 47 act as indexing means to assure a particular valve position when in corresponding alignment. Similar indexing can be accomplished through use of U-shaped grooves 51 in cooperation with pins, balls, probes or the like that can be carried on the primary conduit 31 or the sealing ring 37 of FIGS. 1 and 2.

Figure 4:
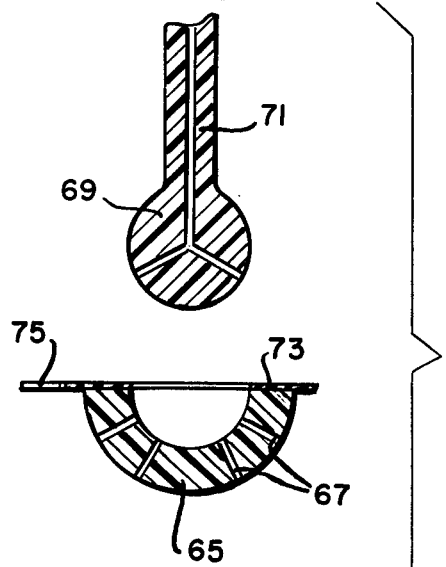
FIG. 4 is an exploded view of selected valve components illustrating the use of a hemispherical sleeve within a multiple-port valve assembly.

FIG. 4 illustrates an exploded view of multiple-port valve components including a hemispherical socket 61 with a plurality of secondary conduits 63 attached, a floating hemispherical sleeve 65 provided with a number of radial passageways 67 and a spherical valve plug 69 complete with attached primary conduit 71. In this particular configuration, the spherical valve plug 69 is sized to fit within the hemispherical sleeve 65 which in turn nests within the lower hemispherical socket 61. Sleeve 65 can be attached to a sealing ring 73 equipped with indexing tabs 75 for independent rotation relative to the hemispherical socket 61 and spherical valve plug 69. Abrupt off-on programming can thereby be performed merely by rotation of hemispherical sleeve 65 while maintaining other valve components in position.

Other modifications to the multiple-port valve described herein can include O-rings of appropriate lubricative material for sealing around each of the plurality of ports in the spherical valve plug as it nests against the hemispherical socket or hemispherical sleeve. Such rings may also be incorporated near the open ends of the hemispherical sockets. Such sealing rings and other types of sealing means are included for vacuum-service operation or operation at elevated pressures substantially more than that required to provide flow through the valve.

Although the present invention has been described in terms of specific embodiments, it will be clear that various modifications known to those skilled in the art can be incorporated. For instance, the primary and secondary conduits can be reversed in their upper and lower hemispherical arrangements. The valve inlet may be either the primary conduit or one or more of the plurality of secondary conduits as required. Slightly elongated or otherwise altered spherical and hemispherical plugs and sockets may also be chosen for particular applications.

The valve of the present invention can easily be adapted for vacuum service through suitable sealing means. It can also be used for gas or plasma flow transfer. In addition, the concept on which the valve design is based is adaptable to the electrical arts for providing electrical switching devices for both AC and DC electric currents. As an example, an electric switch mechanism can be provided to control a valve or fluid flow transfer device in an arrangement in which both the switch with multiple contacts and the valve with multiple ports are of similar construction.

It will be clear that the present development provides an improved multiple-port valve that in a straightforward manner can introduce fluid flow from one inlet to one or more of a plurality of outlets or from one or more of a plurality of inlets into a single outlet. It will also be clear that such a valve can be operated to briefly divert undesired fluid flow into a dump outlet and can be positioned to terminate flow to all inlets and outlets.

The embodiments of the invention in which an exclusive property or privilege is claimed are defined as follows:

1. A multiple-port valve assembly for interconnecting a primary conduit with one or more of a plurality of secondary conduits comprising:

a first generally hemispherical socket having a slotted opening that movably receives said primary conduit;

a second generally hemispherical socket rotatably and sealingly attached to said first socket to define a generally spherical volume within the two sockets;

said second socket having a plurality of openings each in fixed communication with one of said plurality of secondary conduits;

a generally spherical, solid plug rotatably received within said spherical volume within the two sockets, said plug having a first passageway for receiving an open end portion of said primary conduit and having a plurality of secondary passageways each extending from said first passageway to one of a plurality of ports within the outer surface of said plug, the plurality of ports being alignable each with at least one of said plurality of openings within said second hemispherical socket by rotation of the plug about an axis coinciding with the received primary conduit end portion, by tilting the primary conduit within the slotted opening of the first hemispherical socket and by rotating the first hemispherical socket along with the spherical plug in relation to the second hemispherical socket.

2. The multiple-port valve of claim 1 wherein said first passageway and said plurality of ports are within opposite hemispherical portions of said plug and are alignable in correspondence with the first and second hemispherical sockets, respectively.

3. The multiple-port valve of claim 1 wherein said plug and hemispherical sockets are mutually engaged in lubricative, sealing contact to permit relative rotation and sealed closure of ports at locations out of correspondence with socket openings.

4. The multiple-port valve of claim 1 wherein said plug outer surfaces comprise polytetrafluoroethylene and the inner surfaces of said sockets comprise glass or a steel alloy.

5. The multiple-port valve of claim 1 wherein indexing means are included in said slotted opening of said first hemispherical socket to permit indexed rotation of the generally spherical plug corresponding to movement of the primary conduit within the slotted opening of the first generally hemispherical socket.

6. The multiple-port valve of claim 1 wherein said first and second hemispherical sockets being in sealing, lubricative engagement to permit relative rotation and including indexing means along the interface therebetween for precision, rotational movement.

7. The multiple-port valve of claim 1 wherein said ports within said generally spherical plug and said openings within the second hemispherical socket are arranged in mutually alignable circumferences on the corresponding spherical surfaces.

8. The multiple-port valve of claim 1 wherein a floating sleeve is interposed between said spherical plug and said second hemispherical socket, said sleeve having a plurality of openings alignable with the openings within said second hemispherical socket.

9. The multiple-port valve of claim 1 wherein the slotted opening within the first hemispherical socket extends between the apex of said socket to the interface with the second hemispherical socket over an arc of about 90°.

10. The multiple-port valve of claim 1 wherein the plurality of conduits and openings engaging the second hemispherical socket include one conduit of larger diameter than that of each of the other of the plurality of conduits, the one larger conduit is positioned at the apex of the second hemispherical socket and wherein a generally spherical plug includes a circular array of ports each of which being simultaneously alignable with a corresponding circular array of openings within the second hemispherical socket and each of which being separately alignable with the one larger conduit at the apex when the primary conduit is positioned at the circumferential extremity of the slot within the first hemispherical socket.

* * * * *